April 25, 1961 D. C. BROWN 2,980,951
MOLD OPENER
Filed Sept. 8, 1958 2 Sheets-Sheet 2
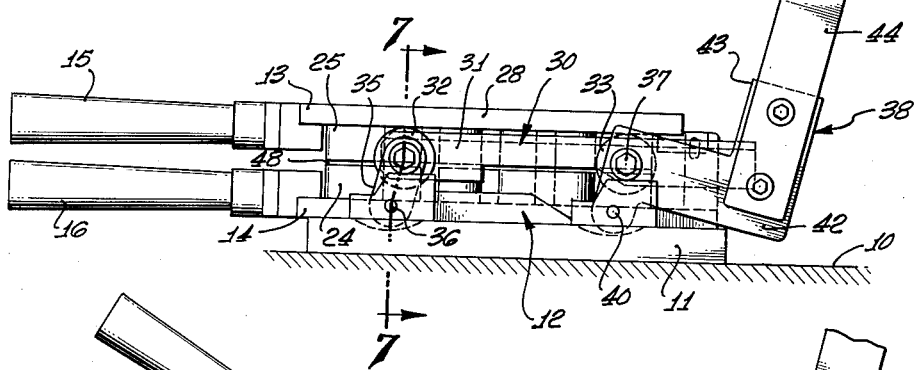
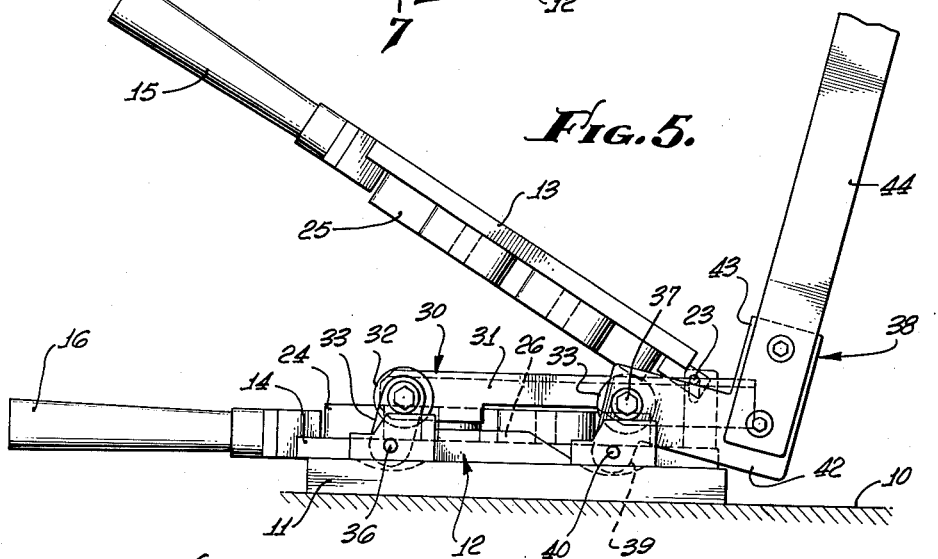
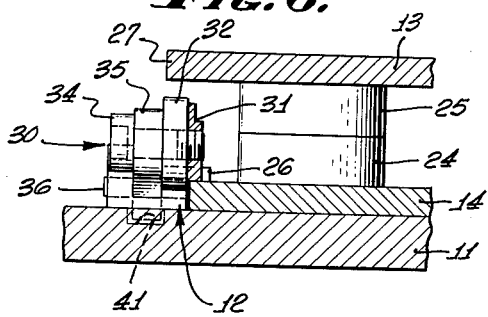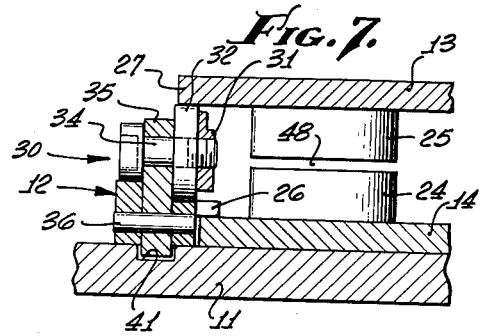
INVENTOR.
DAVID C. BROWN
BY Beehler & Shanahan
ATTORNEYS.

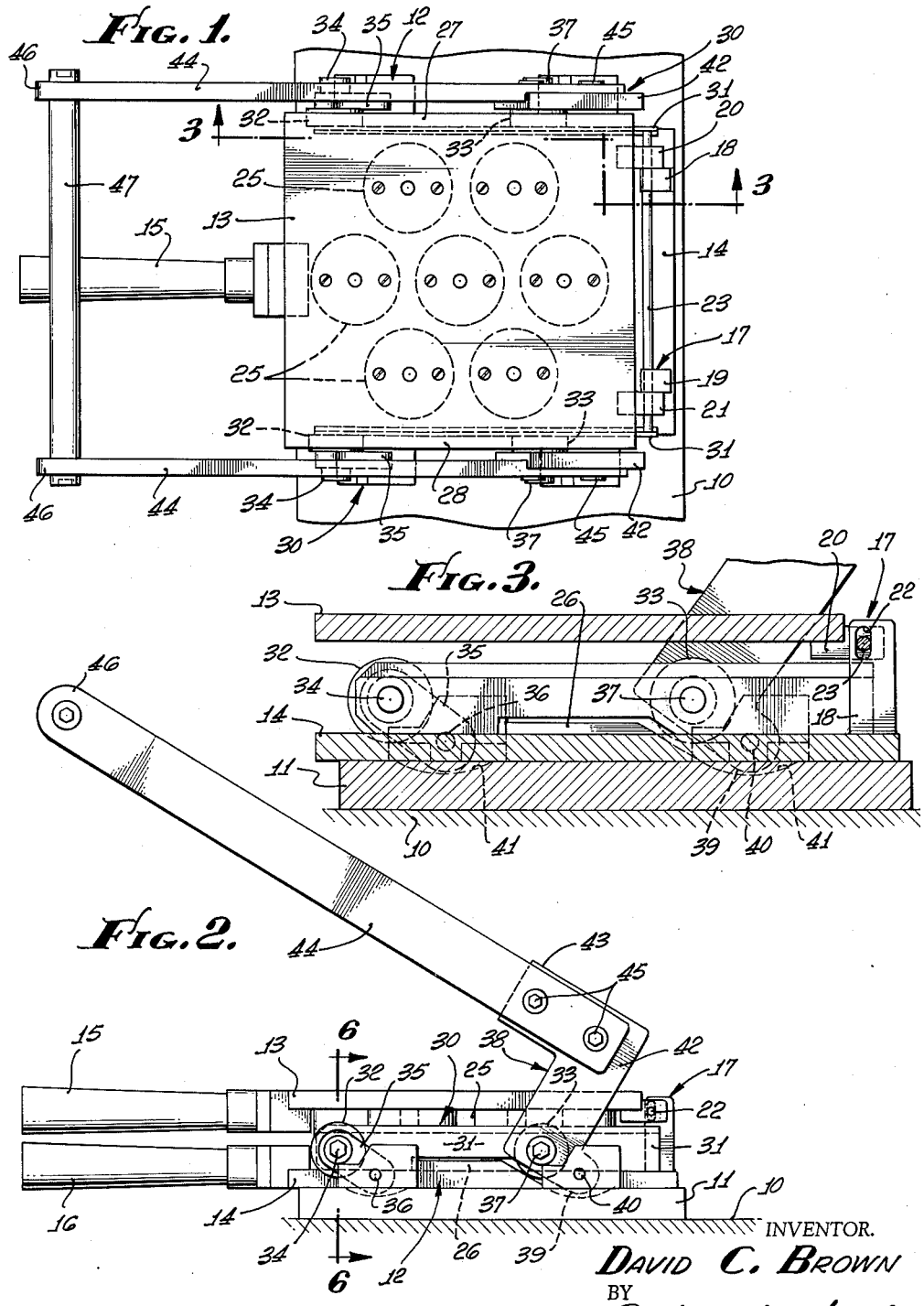

United States Patent Office 2,980,951
Patented Apr. 25, 1961

2,980,951
MOLD OPENER

David C. Brown, Sierra Madre, Calif., assignor to Sierra Engineering Co., Sierra Madre, Calif., a corporation of California Filed Sept. 8, 1958, Ser. No. 759,799
1 Claim. (Cl. 18—2)

The application relates to molding devices and has particular reference to a molding apparatus and a mold opener or mold breaker associated therewith for the purpose of initially cracking the mold in a manner which will not disturb the molded pieces and thereafter enabling the mold to be opened widely in order that the molded pieces can be removed.

It is well recognized that the art of molding is an extremely old art and has long been confronted with the problem of initially cracking open complementary halves of a mold, wherafter the complementary halves can be more readily separated to permit extraction of the molded pieces. It is further well recognized that the most difficult portion of the mold opening operation is the initial cracking of the molded parts in such fashion that the molded parts are in no way damaged during this initial phase of the opening operation which requires a great deal of force.

Although the need for effective mold opening devices has been great, resort is had even to this day of jarring and striking the mold in order to make the initial break. The last-mentioned technique has been especially prevalent in the use of small molds, light enough to permit them to be lifted about by the operator. The crude cracking or breaking operation, however, though acceptable for certain operations, has been extremely ineffective where the mold pieces are delicate or of a critical nature which cannot be subjected to crude mold opening methods.

Furthermore, it has been demonstrated that where a substantial amount of physical exertion is needed to operate molding machines, even though the operation can be accomplished, the operation becomes increasingly costly because of the inefficiency due to lost time and also due to fatigue of the operator.

It is therefore among the obects of the invention to provide a new and improved mold device wherein the mold platens can be easily and efficiently handled and wherein once placed in the machine they can be quickly and easily broken open, thereby to permit the platens to be opened wide for the extraction of the molded particles.

Another object of the invention is to provide a new and improved molding apparatus which makes use of relatively flat complementary platens wherein a simple framework is provided for reception of the platens in such fashion that by a quick and simple lifting operation the platens can be separated bodily from each other, thereby eliminating any rubbing or wearing, either of adjacent mold faces or of the articles molded during the preceding molding operation.

Still another object of the invention is to provide a new and improved mold opener or mold breaking device which permits the platens of the mold to be quickly inserted therein, after which by a single effective movement of a handle the platens are separated from each other by the exercise of relatively little effort, after which the mold opening mechanism is completely removed out of the way of the platens, permitting them to be further separated for the ready extraction of the molded parts.

Still further among the objects of the invention is to provide a new and improved mold opening mechanism which is possessed of a very high mechanical advantage so applied to parallel mold platens that they can be quickly and effectively separated by bodily movement, one with respect to the other, a substantial distance and with a relative minimum amount of effort, the mold opening or cracking movement being accomplished in one continuous swing of a handle which is moved out of the way at the completion of the braking operation, thereby to permit manipulation freely of the platens which contain the molded pieces.

With these and other objects in view, the invention consists in the construction, arrangement and combination of the various parts of the device whereby the objects contemplated are attained, as hereinafter set forth, pointed out in the appended claim and illustrated in the accompanying drawings.

In the drawings:

Figure 1 is a plan view of the mold apparatus in closed position.

Figure 2 is a side elevational view of the mold apparatus in closed position.

Figure 3 is an elevational sectional view taken on the line 3—3 of Figure 1 with the mold apparatus in closed position.

Figure 4 is a side elevational view similar to Figure 2 but showing the mold opener in open position.

Figure 5 is a side elevational view similar to Figures 2 and 4 showing the next successive step wherein the mold itself is opened.

Figure 6 is a transverse fragmentary sectional view taken on the line 6—6 of Figure 2.

Figure 7 is a transverse fragmentary sectional view taken on the line 7—7 of Figure 4.

In an embodiment of the invention chosen for the purpose of illustration there is shown a mold apparatus adapted for mounting upon a support 10, the mold apparatus consisting of a bed 11 upon which frame members 12 are mounted. The bed and the frame members together which may be said to comprise a substantial portion of a frame are designed and adapted to receive a pair of upper and lower mold platens 13 and 14. The mold platens are provided at forward ends respectively with handles 15 and 16 and at the opposite end with a hinge indicated generally by the reference character 17. More particularly, the hinge consists of a pair of columns 18 and 19 welded to a rearward portion of the platen 14 and lugs 20 and 21 on the upper platen 13. In the columns are vertically extending slots 22 which receive opposite ends of a hinge pin 23, thereby to retain the lugs in hinged relationship to the columns. The hinge, however, is one which not only pivots but also permits bodily movement of the lugs and attached platen 13 with respect to the platen 14.

Although details of the mold cavities are of secondary importance, by way of example it may be noted that the lower platen 14 contains in the chosen example a series of seven female mold parts 24 and the platen 13 contains a corresponding number of male mold parts 25 which are precisely in axial relationship with each other when the platens are in closed position parallel to each other, as illustrated in Figures 1 through 3, inclusive.

The frame member 12 on each side includes a portion which may be described as a retainer 26 which is at a location overlying the outermost edge of the lower platen 14. In other words the retainer is so positioned that it provides a space between the lower surface of the retainer and the upper surface of the bed 11 so that the platens when matched together in closed relationship can be slid into position between the frame members and there made ready for opening.

In the chosen embodiment the upper platen 13 is somewhat wider than the platen 14 whereby to provide overhanging portions 27 and 28.

At each side of the frame is a separating beam assembly indicated generally by the reference character 30. Inasmuch as the beam assembly on each side is identical except for being in a right-hand or left-hand position, details of only one of the beam assemblies will be described.

More particularly, the beam assembly consists of a substantially horizontal beam 31 at the forward end of which is a roller 32 and on the rear end of which is a roller 33. The forward rollers are secured in position by means of a bolt 34 but it should be understood and appreciated from an examination of the drawings that the bolt also serves as a pivot connection between the beam 31 and the upper end of a link 35. A pin 36 serves as a connection at the other end of the link 35 by means of which the link is pivotally secured to the frame member 12.

At the rearward end of the frame member the roller 33 is attached to the beam 31 by use of a bolt 37 which also serves to connect a somewhat composite angular link 38 to the beam 31. A lower part 39 of the composite angular link 38 is pivotally secured by use of a pin 40 to the frame member 12. The pivot connection formed respectively by the bolt 34 and pin 36 at one end and the bolt 37 and pin 40 at the other end are substantially the same and are substantially equal to the spacing of similar bolts and pins on the beam assembly at the opposite side of the device. By the construction just described there is in essence a parallelogram arrangement consisting of the links forming two sides and the other two sides formed respectively by the beam 31 and the frame member 12. Because of the relationship of the parts, there is provided a recess 41 in the bed 11 for reception of the lower end of each link 35 and lower part 39 of the angular link 38.

Each composite angular link 38 includes a section 42 at the outer end of which is a bracket 43 substantially at right angles to the section 42 and substantially parallel to the lower part 39. An operating extension or arm 44 on each side is bolted to the bracket 43 by means of bolts 45. At the outermost ends 46 of the arms 44 is a handle 47. It will be noted particularly from an examination of Figure 1 that the arms 44 are wide apart and the handle 47 is positioned at such distance from the opposite ends of the arms to provide ample space between the arms and below the arms and handle 47 for the positioning of the handles 15 and 16 of the respective mold platens.

In closed position of the mold which is in operative position of the mold opening mechanism, the arms 44 and handle 47 extend obliquely upwardly and forwardly, as illustrated in Figure 2. In this position the rollers 32 and 33 are lowered to locations well below the respective overhanging portions 27. After the platens have been slid into place, as previously described, wherein the lower platen 14 is held beneath the retainer 26 on both sides and it becomes desirable to open the mold, the handle 47 is swept arcuately upwardly and rearwardly from the position of Figure 2 to the positions suggested in Figures 4 and 5. During this upward sweep, the angular links 38 are rotated clockwise, as viewed in Figures 2, 3, 4 and 5 and, being attached on each side to both the frame member 12 and the beam 31, the links 35 are caused to rotate simultaneously and in the same direction. In consequence as the links 35 and 38 are rotated, they elevate the beams 31 until the rollers 32 and 33 engage the bottom of the overhanging portions 27 and 28.

As the handle continues to be forced upwardly and rearwardly, the links 35 and 38 continue to move to an upright position, thereby causing both forward and rearward ends of the upper platen to be moved simultaneously upwardly away from the lower platen which is retained below the retainers 26. After the arms 44 have reached the position illustrated in Figures 4 and 5, the rollers 32 and 33 will be at their uppermost positions, against the respective overhanging portions, which will be an amount sufficient to entirely break the upper platen 13 from the lower platen 14 by a distance indicated by the space 48 in Figure 4.

The operation up to this time has described no more than the cracking or initial separation of the mold platens. This is the portion of the operation which requires the greatest exercise of force and because of the fact that the arms 44 have been made relatively long and the lower parts 39 relatively shorter, a considerable mechanical advantage is built into the leverage and sufficient force is applied to the lower part 39 because of a corresponding force being applied to the forward links 35. Hence the corresponding rollers moving upwardly at the same rate cause the upper platen to move parallel with respect to the lower platen. It will further be understood that by reason of providing slots 22 for the the hinge pin 23, the hinge will permit the parallel separation made reference to.

After the arms 44 have been moved to the rear as illustrated in Figures 4 and 5, there is complete accessibility to the mold platens without interference being experienced with any of the structural portion of the device. Therefore, by use of the handles 15 and 16, the upper mold platen 13 can be lifted upwardly to a vertical position and tilted rearwardly until the handle 15, if need be, rests against the handle 47. This completely opens the platens which comprise the mold, whereupon the molded articles contained within the mold portion 24 in the lower mold can be extracted by hand.

When the mold is to be again loaded, the appropriate slugs of molding material can be placed in the mold portion 24 while the upper platen remains in full open position. After this the upper platen 13 can be pivoted about its hinge until the mold platens lie in the relationship illustrated in Figure 2. The mold platens thereafter may be slid together forwardly from the retention by the retainers 26 and removed together from the opening mechanism whereupon the platens can be placed in a suitable curing oven, not shown, for that portion of the operation.

Following curing, the platens are inserted in the opening mechanism in the manner heretofore described and the opening operation is thereafter repeated.

It will be understood and appreciated from the foregoing description that the mold opening mechanism incorporates a considerable mechanical advantage so that a relatively light lifting froce on the handle 47 is sufficient to provide a greatly increased opening or cracking force on the links and rollers, thereby making it possible to break open the mold. Because of the swinging or sweeping movement of the mold opening mechanism and the mold handles being in substantially the same direction and located in a sense one within the other, all manual operations are confined to a relatively small space and the rapidity of operation of the mold opening and mold closing is greatly improved. The short positive strokes inherent in the mechanism make possible the rugged design illustrated wherein parts can be made just as heavy as is necessary in order that the performance may be depended upon for longer periods of use. Breaking platens open in a parallel direction virtually eliminates any rubbing or wear of parts, since the platens need not be rotated about the hinge until the parts are entirely clear of each other. Further still, although a relatively small mold has been chosen for the purpose of illustration, the principle is such that it can be applied to mold platens of virtually any size and containing virtually any number of cavities for the molding of sundry types of mold substances which include rubber, plastic and metal.

Moreover, the simple mechanical movement required of the arms 47 makes the mold opening operation one readily adapted to power operation by employment of relatively simple, mechanical expedients.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices.

Having described my invention, what I claim is new and desire to secure by Letters Patent is:

A mold device comprising a support frame, a lower mold platen and an upper mold platen, the platens having complementary mold surfaces and each having opposite end edges and opposite side edges, the upper platen extending beyond the corresponding side edges of the lower platen, the platens being adapted to fit against each other at their mold surfaces and the platens being adapted to be separated, retainers on the frame engageable with the lower platen for releasably securing the lower platen in fixed position in the frame, platen separating assemblies adjacent respective side edges of the lower platen, each assembly comprising a beam extending parallel to a side edge of the lower platen and a pair of parallel spaced apart links, each link being pivotally connected to the frame and to said beam, the links being of a common length between their respective beam and frame connections whereby the frame, links and beam are pivotally connected together in a parallelogram arrangement, and as the links are swung on their frame pivots the beam will move between two extreme parallel positions from proximate the frame to more remote the frame, a lever arm interconnecting said assemblies whereby the assemblies move in unison, a plurality of rollers on each beam extending upwardly beyond the beams, said rollers being engaged against the under surfaces respectively of the side extension of the upper platen to separate the platens when the lever arm is operated to move the beams from said proximate position toward said remote position, and hinge elements operatively connected to the platens adjacent one end edge of each platen for pivotally interconnecting the platens, the hinge element for one platen comprising a lug, said lug having an elongate slot of uniform width formed therein and extending in a direction perpendicular to said mold surfaces, the hinge element for the other platen comprising a pin slidable longitudinally in said slot, said pin having a dimension measured transversely of the slot which is substantially equal to the width of the slot whereby the platens are restrained against relative movement in a direction parallel to said mold surfaces.

References Cited in the file of this patent

UNITED STATES PATENTS

| | | |
|---|---|---|
| 1,606,485 | Smouse | Nov. 9, 1926 |
| 2,508,522 | Kastner | May 23, 1950 |
| 2,718,030 | Collins et al. | Sept. 20, 1955 |
| 2,859,477 | Millhoff | Nov. 11, 1958 |

FOREIGN PATENTS

| | | |
|---|---|---|
| 171,047 | Austria | Apr. 25, 1952 |
| 891,662 | France | Mar. 15, 1944 |
| 1,147,146 | France | Apr. 13, 1956 |
| 347,182 | Germany | Feb. 26, 1920 |